Nov. 30, 1926.
P. BASTIEN
BRAKE
Filed June 29, 1923
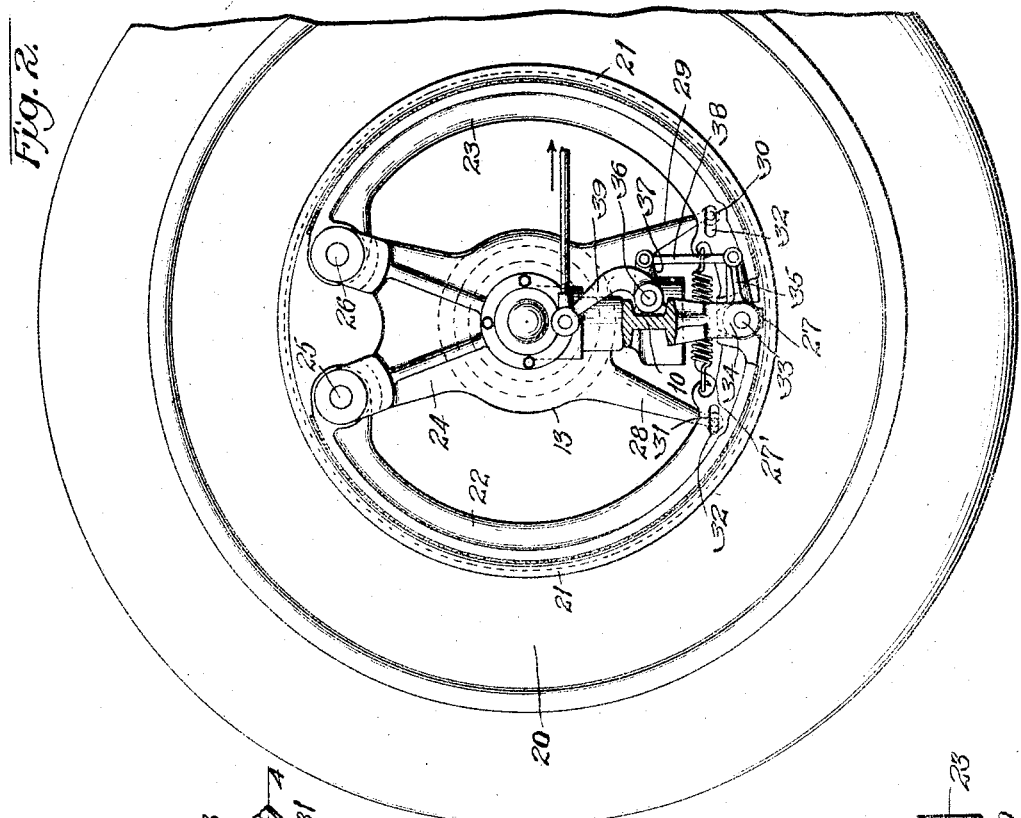
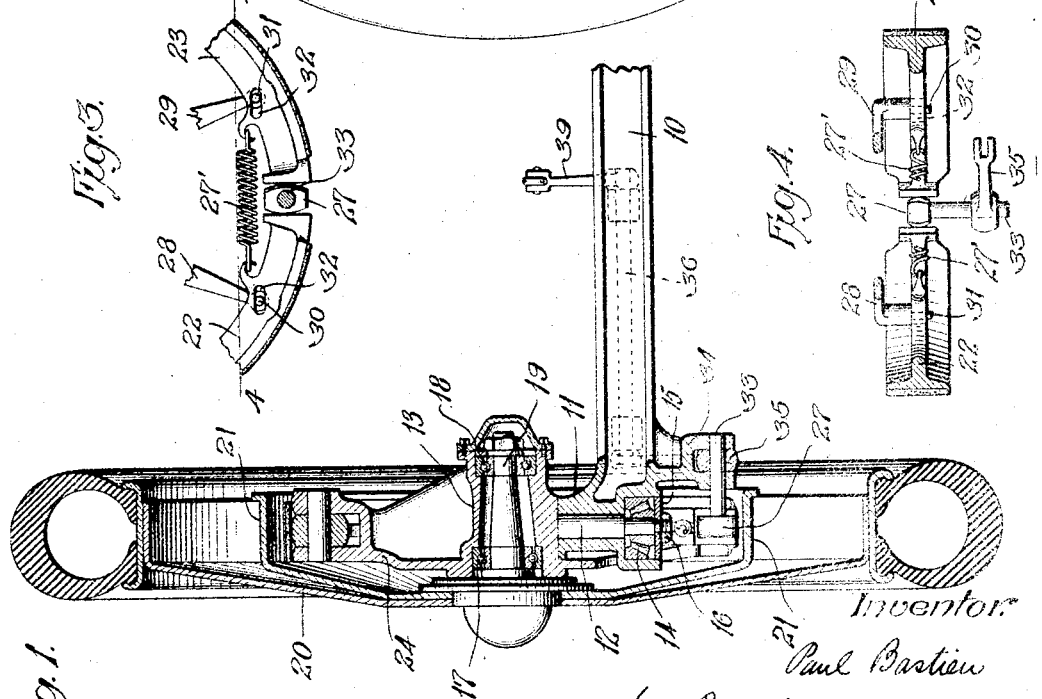
Inventor
Paul Bastien
by B M Kent
Attorney.

Patented Nov. 30, 1926.

1,609,105

UNITED STATES PATENT OFFICE.

PAUL BASTIEN, OF CLEVELAND, OHIO.

BRAKE.

Application filed June 29, 1923. Serial No. 648,472.

This invention relates to vehicles and more particularly to brakes for steering wheels and has reference to that type of steering wheel which is pivotally mounted at the end of a relatively fixed axle.

It is one of the objects of the invention to provide a brake, for the purpose specified, that will be simple in construction and effective in operation and which will not be detrimentally affected, as to its application, by the steering movements of the vehicle.

A further object of the invention is to provide a brake especially adapted for disc wheels and that type of wheel mounting in which the wheel carries a spindle that is rotatably arranged in a bearing support, as distinguished from the usual type in which the hub of the wheel rotates on the spindle.

Other objects and the features of novelty will be apparent from the following description taken in connection with the accompanying drawings of which:

Figure 1 represents an axial section through a wheel having my invention applied thereto;

Fig. 2 is a side elevation of the parts shown in Fig. 1;

Fig. 3 is a fragmentary side elevation of the brake itself; and

Fig. 4 is a section on the line 4—4 of Fig. 3.

Referring to the drawings, 10 indicates the usual stationary axle which is provided at its end (only one end being shown) with a vertically arranged bearing 11 for the pivot 12 of the bearing support 13. The vertical thrust is transmitted from the axle 10 to the pivot 12 by means of a thrust bearing 14, arranged in a suitable socket in the end of the axle 10, the thrust being transmitted from the bearing 14 to the pivot 12 by means of the washer 15 and the nut 16.

The bearing support 13 has arranged therein the bearings 17 and 18 in which the spindle 19 of the wheel 20 is mounted. The details of the wheel mounting are not a part of the present invention and therefore a detailed description is believed to be unnecessary. The wheel 20 carries a brake drum 21 of the usual form with which a brake consisting of the pair of shoes 22 and 23 coöperates. I prefer to use a pair of brake shoes but it will be understood that any of the ordinary forms of brake commonly used may be employed in place of the shoes 22 and 23. The support 13 is provided with an upwardly extending bracket 24 to which the shoes 22 and 23 are pivoted, as indicated at the points 25 and 26. The free ends of the brake shoes 22 and 23 are arranged directly below the pivot 12 and a cam 27 is arranged in axial alignment with the pivot 12 and between the free ends of the brake shoes for the purpose of spreading the latter. The ends of the brake shoes are held against the cam 27 by a spring 27', or by any other suitable means.

Downwardly extending arms 28 and 29 are arranged on the support 13 and carry pins 30 and 31, respectively, which project through slots 32 in the brake shoes to guide the latter.

The cam 27 is mounted on a shaft 33 and the latter is supported in a bracket 34 that extends downwardly from the axle 10. There is an arm 35 on the shaft 33 by means of which the shaft is actuated. The axle 10 is preferably of the I-beam section and carries in the channel in the side face thereof, and preferably on the rear side, a shaft 36 having an arm 37 that is connected with the arm 35 by a link 38. An arm 39 is also arranged on the shaft 36 and is connected in any suitable manner with a control lever on the body of the vehicle.

From Fig. 4 it will be observed that the cam 27 is rounded substantially about the axis of the pivot 12 to permit the brake shoes 22 and 23 to swing relatively to the cam, in accordance with the steering movements of the wheel 20, without affecting the setting of the brake.

In the operation of the brake the arm 39 is actuated from the appropriate control lever on the body of the vehicle and the cam 27 rocked about its horizontal axis which effects the spreading of the ends of the brake shoes and applies the brake. The cam being arranged in line with the axis of the pivot 12 permits the wheel to swing in accordance with the required steering movements without in any way disturbing the brake, due to the sides of the cam 27 being curved, as shown in Fig. 4.

Having thus described my invention, what I claim is:

1. In brakes for steering wheels of a vehicle, the combination of an axle, a bearing support pivotally mounted at the end of said axle and above the same, a wheel spindle journaled in said support, a wheel attached to said spindle, a brake drum on said wheel, a bracket on said support projecting upwardly therefrom, a brake pivoted to said bracket, a cam for actuating said brake arranged below and in axial alignment with the pivot of said support, a bracket on said axle projecting downwardly therefrom, a shaft on said bracket and on which said cam is mounted, a second shaft carried by said axle, arms on said shafts, and a link for connecting said arms.

2. In brakes for steering wheels of a vehicle, the combination of an axle of I-beam form, a bearing support pivotally mounted at the end of said axle and above the same, a wheel spindle journalled in said support, a wheel attached to said spindle, a brake drum on said wheel, a bracket on said support projecting upwardly therefrom, a brake carried by said bracket and having its actuating ends arranged below the pivot of said support, a cam arranged between said actuating ends of the brake in axial alignment with said pivot, the faces of said cam being curved substantially about the axis of said pivot, a shaft extending longitudinally of said axle and supported in the channel in one side thereof, a bracket extending downwardly from said axle, a shaft carried by the last mentioned bracket and on which said cam is mounted, arms on said shafts, and a link connecting said arms and whereby the latter shaft actuates the former.

In testimony whereof I affix my signature.

PAUL BASTIEN.